Feb. 7, 1950  R. R. THOMAS  2,496,608

SICKLE BAR ELEVATOR

Filed March 29, 1948

INVENTOR.
Roy R. Thomas
BY
Glenn L. Fish
ATTORNEY

Patented Feb. 7, 1950

2,496,608

UNITED STATES PATENT OFFICE 2,496,608

SICKLE BAR ELEVATOR

Roy R. Thomas, Spokane, Wash., assignor to
Lyle Gordan McLean, Spokane, Wash.

Application March 29, 1948, Serial No. 17,737

5 Claims. (Cl. 56—25)

My present invention relates to an improved sickle bar elevator of the type adapted for use on tractor drawn and operated sickle mowers.

Generally my elevator or lift mechanism comprises a gear cluster and clutch arrangement operable on the power shaft for the sickle bar to drive a worm gear shaft in a meshing sleeve on the sickle bar drive unit so that actuation of the clutch will rotate the worm gear shaft in either selected direction to raise or lower the sickle bar.

In the accompanying drawings I have illustrated one complete example of the physical embodiment of my invention according to the best mode I have thus far devised but it will be understood that various changes and alterations may be made in the exemplified structure within the scope of the appended claims.

Figure 1:
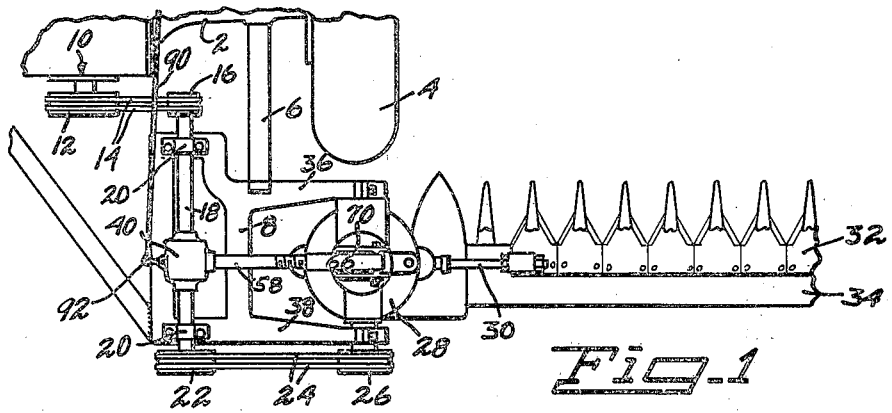
Figure 1 is a top plan view of the sickle bar attachment for a tractor showing the elevating mechanism of my invention.
Figure 2:
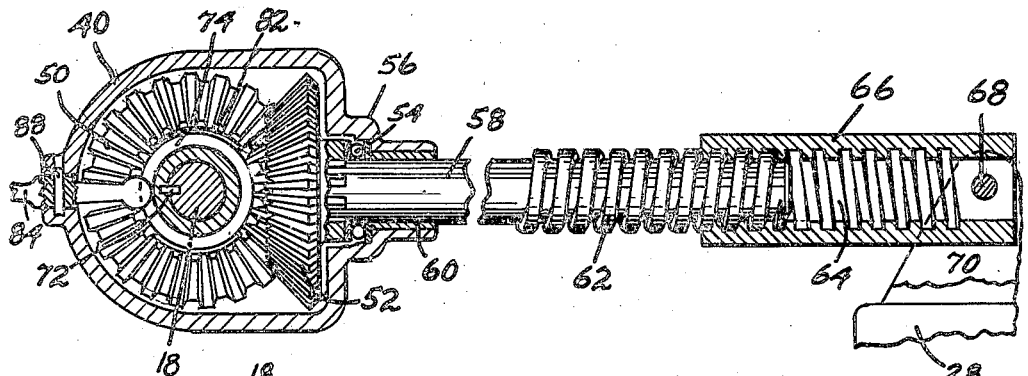
Figure 2 is a longitudinal vertical sectional view through the elevator.
Figure 3:
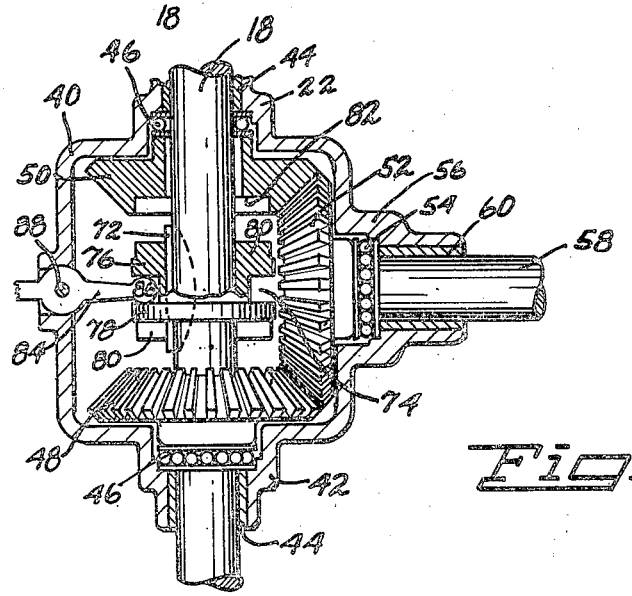
Figure 3 is a horizontal sectional view thereof.

Referring now to the drawings wherein I have illustrated the present preferred embodiment of my invention I use the frame portion 2 of a tractor of suitable and conventional design having a wheel tire 4 and the frame arm 6 supporting the sickle bar base 8.

A power takeoff unit 10 includes a pulley 12 driving belts 14 and these belts in turn drive the pulley 16 on shaft 18 which is journaled in brackets 20 on base 8. Pulley 22 and belts 24 drive pulley 26 and its shaft, a part of the driving mechanism 28 for the shaft 30 which reciprocates the sickle bar 32 on its support 34. The driving mechanism 28 is pivotally mounted in the arms 36 and 38 of base 8 and it is the purpose of my invention to mechanically raise or lower the sickle bar to elevate the bar from operating position or vice versa.

A housing 40 has collars 42 formed with bushings 44 journaled on shaft 18 and within the housing I provide thrust bearings 46 for the beveled gears 48 and 50 rotatable on shaft 18. A third beveled gear 52 meshes with the gears 48 and 50 and has a thrust bearing 54 in the collar 56 of housing 40. The shaft 58 for the gear 52 is journaled in bushing 60 and at its outer end is formed with a helical or worm thread 62. This threaded end meshes the interior worm thread 64 of sleeve 66 which is pivotally secured by pin 68 to bracket 70 on the drive mechanism 28.

To control the direction of rotation of gear 52 and shaft 58 I employ a clutch collar on and keyed at 70 to shaft 18, and formed with an annular groove 74. The discs 76 and 78 have lugs or dogs 80 for enmeshing with the grooves 82 of the gears 48 and 50 selectively.

A shifting arm 84 has a ball 86 located in the groove 74 and pivoted at 88 in the housing, and a link 90 is connected at 92 to the arm 84 so that the operator of the tractor may by moving the link forward or backward, shift the collar backward or forward to operatively connect either gear 48 or 50 with the shaft 18 and in turn rotate the gear 52 and its shaft. The movement of the shaft 58 clockwise looking toward the threaded end thereof will shorten the shaft and sleeve and raise the mower bar, while counter-clockwise movement of the shaft will lengthen the shaft and sleeve and lower the bar and support.

From the above description of the elevator of my invention it will be apparent that without effort on behalf of the operator the sickle bar may be raised or lowered at will merely by control of the clutch collar in the housing 40 utilizing the power in the shaft 18 from the usual power take-off mechanism.

Having thus fully described my invention what I claim as new and desire to secure by Letters Patent is:

1. In a sickle bar elevator, the combination with a power take-off shaft for a tractor and a pivotally mounted drive unit for the sickle bar, of a gear cluster and housing journaled on the take-off shaft, clutch means for selectively operating the driven gear of the cluster, an elevating shaft rigid with the said driven gear, and means connecting the elevating shaft and the drive unit to pivot the unit and the sickle bar.

2. In a sickle bar elevator, the combination with a power take-off shaft for a tractor and a pivotally mounted drive unit for the sickle bar, of a gear cluster and housing journaled on the take-off shaft, clutch means for selectively operating the driven gear of the cluster, an elevating shaft rigid with the said driven gear, a worm thread on the elevating shaft, and an interiorly threaded sleeve meshing with the worm thread and connected with the drive unit to pivot the unit and the sickle bar.

3. In a sickle bar elevator, the combination with a power take-off shaft for a tractor and a pivotally mounted drive unit for the sickle bar, of a gear cluster and housing journaled on the take-off shaft, clutch means for selectively operating the driven gear of the cluster, an elevating shaft rigid with the said driven gear, and means connecting the shaft and drive unit whereby rotation of the shaft in one direction will shorten the connecting means and rotation of the shaft in the other direction will lengthen the connecting means.

4. In a sickle bar elevator for a mowing machine, the combination with a base frame, a sickle and its driving unit pivotally mounted on the frame, a driven operating shaft, and power transmission mechanism between said shaft and the driving unit, of an internally threaded sleeve pivotally mounted on the driving unit, a reversible screw bar rotatably threaded in the sleeve, and manually controlled reversible means coacting with and connecting the operating shaft and the screw bar for actuating the latter from the former.

5. In a sickle bar elevator for a mowing machine, the combination with a base frame, a sickle and its driving unit pivotally mounted on the base frame, a driven operating shaft, and power transmission mechanism from said shaft to the driving unit, of a pair of spaced bevel gears journaled on the shaft and a housing for said gears, an internally threaded sleeve pivoted on the driving unit, a reversible screw bar rotatably threaded in the sleeve and journaled in the housing, a bevel gear on the screw bar in mesh with said pair of gears, a clutch device slidable on and rotatable with the shaft for selective engagement with the pair of gears, and manually controlled means for said clutch.

ROY R. THOMAS.

REFERENCES CITED

The following references are of record in the file of this patent:

UNITED STATES PATENTS

| Number    | Name    | Date          |
|-----------|---------|---------------|
| 1,343,732 | Leopold | June 15, 1920 |
| 2,299,841 | Moyer   | Oct. 27, 1942 |
| 2,329,881 | Clapper | Sept. 21, 1943 |